UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

COATING COMPOSITION.

1,189,550. Specification of Letters Patent. Patented July 4, 1916.

No Drawing. Application filed July 25, 1911. Serial No. 640,401.

*To all whom it may concern:*

Be it known that I, CARLETON ELLIS, a citizen of the United States, and a resident of Montclair, in the county of Essex and State of New Jersey, have invented certain new and useful Improvements in Coating Compositions, of which the following is a specification.

This invention relates to or coating compound adapted for use as concrete coating finish compositions and relates particularly to compositions containing an unsaponifiable or substantially unsaponifiable resinous or other finish or coating material adapted for tinting and waterproofing concrete surfaces, all as more fully hereinafter set forth and as claimed.

The presence in concrete of a considerable amount of alkaline material makes it undesirable to use linseed oil or other easily saponifiable oil as a base for concrete paint. An unsaponifiable or alkali-resisting coating is required and this can be secured advantageously only by the use of an unsaponifiable finish-coating body or one which, originally saponifiable, has been so treated as to be unaffected by the alkalis of concrete. To be sure it is sometimes feasible to coat with linseed oil paint, concrete which has been exposed to the action of the weather for a considerable period so that the free lime has become carbonated and potash, soda and other soluble alkalis superficially washed away. But concrete usually is painted or waterproofed soon after it has been laid, often before fully dry, and under such circumstances linseed oil has little permanency as a coating material.

It is the object of the present invention to provide a composition capable of withstanding the disintegrating action of weather and alkali and which may be given a body or consistency dependent on the degree of porosity of concrete. As ordinarily prepared concrete is a fairly porous material and absorbs oils very easily by capillary action. In the parlance of the trade this action is known as suction and for the preliminary coating of concrete, oils of high body which resist suction to a considerable degree are often required. Various materials are therefore set forth in the present invention for the purpose of providing consistencies suitable for the various conditions of concrete and cement coating.

As a basis for a cement and concrete coating I preferably make use of a resinous base of a substantially unsaponifiable character, such for example as Jelutong or Pontianak rubber resin. These resins are essentially or characteristically unsaponifiable and thus differ from the resins ordinarily used in the making of varnishes and paint mediums. To be sure there is, in some of the ordinary resins, especially the harder sorts a small and varying amount of unsaponifiable matter but essentially the resins of the varnish trade are saponifiable bodies and therefore not well fitted for serving as a basis for concrete coatings. Most of the resins used in the making of varnishes and paint oils contain not only saponifiable esters but often a large amount of free resin acids. Boiling alcoholic potash readily saponifies these constituents but the alkalis of cement have only a slow saponifying action. In any form of a concrete coating containing acid material for the purpose of neutralizing the alkalinity of concrete, as is the case with certain types of concrete primers, the speed of neutralization has to be considered. If the acid component acts rapidly, neutralization may be effected before the coating has set and dried. If the action of the acid component is slow, neutralization and reaction may go on after setting and drying of the composition thus causing rupturing of the coating and its ultimate destruction. The resin acids differ from the fatty acids in this respect. They are slower than the fatty acids in neutralizing activity, so slow in fact that under ordinary conditions a coating compound has opportunity to dry and harden before neutralizing reactions are fairly under way and these subsequently progress to the detriment of the coating.

The following brief comparison may serve to explain the differences noted. The fats are bodies of synthetic origin and as glycerids form well characterized bodies. The resins are largely bodies resulting from condensation, are very fluctuating in composition and the nature of their components is not at all well established at the present time. The copals, which are so extensively used in varnish making, vary in composition very greatly. Manila copal, for example, may have an acid number of 135 and a saponification value of 185, while Angola copal will perhaps give an acid number of 60 and a saponification value of 135. Borneo copal will give an acid number of about 145 and a saponification value of say 180. Amber contains about 30% resin acids and nearly 70% of saponifiable esters. Common rosin has an acid number of about 140, although this varies considerably with different grades. It consists largely of abietic acid and its anhydrid. Sandarac has an acid number of about 150 but is also subject to considerable variation in composition. However the uncertain composition of resins makes all these figures of indifferent value and the variations in ester value and acidity, together with the further changes taking place in the fusing or melting of the hard gums or resins, preparatory to mixing with oils and thinners, leaves in doubt, always, the action of the resin acids and esters on the alkali. The use therefore of "short oil varnishes", that is varnishes high in saponifiable resin and low in oil, for coating cement structures is at best only a makeshift. The fatty acids from ordinary fats, including such well defined bodies as stearic, palmitic and oleic acids, are more rapid in their neutralizing action and are more homogeneous in composition so that their reaction with cement alkali is more effective and decisive. The same is true of the fatty acids of drying oils, such as linseed and tung or soy bean oils; or the slower drying oils, as corn and cotton seed oil. The fatty acids of the drying oils have the advantage that after neutralizing the superficial alkali of concrete, forming in the main a lime soap of a water insoluble character, drying sets in and a more resistant body is produced. The lime soaps of the resin acids are quite prone to hydrolysis, while the same is true to some extent of the lime soaps of the non-drying oils. The drying oils are better adapted to resist the hydrolyzing action of moisture, as their lime soaps, when applied to concrete in the form of a solution in a suitable solvent or when formed in or on the cement by the action of their fatty acids applied as a priming coat, for example, undergo oxidation and form oxidized soaps which do not exhibit the same hydrolyzable tendencies. Of the drying oils the acid derived from tung oil is perhaps most satisfactory in this respect. The lime tungate which forms on applying tung acid to concrete has excellent waterproofing qualities. Second in this respect, ordinarily, are the acids of fish and linseed oils.

In an application entitled Cement primer, filed May 24, 1909, Ser. No. 497,934; application for binding and coating composition, filed Mar. 29, 1910, Ser. No. 552,178; application for process of coating concrete, filed Oct. 22, 1910, Ser. No. 588,549, now Patent 999,493; application for waterproof coating composition for concrete, etc., filed Feb. 16, 1911, Ser. No. 608,888, now Patent 999,708, application for concrete and stucco paint oil, filed May 20, 1911, Ser. No. 628,577, now Patent 1,005,818; and application for priming and coating concrete, filed July 14, 1911, Ser. No. 638,515, I have set forth the use of fatty acid neutralizers and unsaponifiable or substantially unsaponifiable resinous or other bodies with or without colloidal thickeners or bodying materials for the priming or coating of concrete and other structures and have set forth in particular the advantages of Jelutong or Pontianak rubber resin for this purpose. The present application contains matter derived from these applications and is therefore a divisional continuation of said applications.

Jelutong resin is a waste or by-product derived from the deresination of rubber, as will be hereinafter set forth more in detail, and its resistance to alkali, due to its relatively very high proportion of unsaponifiable bodies, makes it especially useful for the coating of concrete. This alkali-proof quality apparently resides, as indicated, in the very low or almost complete absence of the acids and readily saponifiable esters ordinarily found in varnish resins of the usual type, and in the presence, seemingly, of a large proportion of resistant hydrocarbons derived from the oxidation of rubber. As will be more fully hereinafter set forth, these rubber resins are not readily soluble in benzin, turpentine and the other usual varnish thinners to form stable solutions; and the heat treatment to which ordinary varnish gums are subjected in the manufacture of varnishes in the usual way does not suffice to make solutions which are entirely satisfactory. Pontianak resin may be put into solution in benzin by first heating the resin to 600° F. or higher for about one hour or until a loss in weight of about 20% results. Longer heating at lower temperatures also accomplishes the same result although less effectively. At 400° F. the heat treatment should be maintained for about 18 hours to secure the desired reformation of the resin. At 450° F. twelve hours' heating is sufficient. At these lower temperatures the distillation loss by heating is much less. The product at 400° F. loses only 5% in 18 hours as compared with a loss of 20% for one hour at 600° F. to 625° F. Blowing air into the hot resin shortens the process. This is a dangerous procedure at 600° F. but may be carried out at 400° F. without ignition of the resin. The change or reformation is probably an oxidation process in which the transition products between rubber and rubber resin are destroyed, polymerized or otherwise changed to form more soluble bodies. The raw resin is more soluble in benzol and coal tar hydrocarbons than in petroleum thinners but the latter are more acceptable to the paint trade through the customary use of benzin and light kerosene as paint thinners. Mixtures of benzin and benzol serve well, especially on the resin products prepared by heat treatment at about 400° F. with aeration.

In Ser. Nos. 588,549 and 608,888 I have called attention to the difficulty of securing solutions of resinous bodies such as pontianak in a strength or concentration sufficiently great for practical commercial use as waterproofing finish coatings for concrete. I have also called attention to the granulation which occurs on exposure of a thin layer of a solution of potianak in an incompatible solvent, or in compatible solvent, if the concentration is too great. It is very important in coating concrete to secure a coherent waterproofing finish and in using pontianak in a form which granulates on exposure no satisfactory degree of coherency can be obtained. A saturated solution of pontianak in naphtha (benzin) or about one part of the resin to 3½ to 4 parts of benzin is unsatisfactory as a finish material or composition. The resin is present in an unstable form and on coating and drying the granulation or "crystallization" referred to sets in and loss of coherency results. Then too, such dilute solutions have poor filling or pore-closing properties due to the small amount of non-volatile matter present. A 15% or 20% solution is not sufficient for porous concrete although it may sometimes answer for very dense concrete. A concentration of 25% and better 30% or 35% is required from the practical standpoint.

A concrete priming or finish coating composition should primarily or essentially contain an unsaponifiable body or bodies in an amount of 25% or more, and these unsaponifiable bodies should be finish-forming constituents. The composition should be stable and fluent and flowable. It should work freely under the brush and be of a consistency which permits of the use of spraying devices, when required. Of utmost importance is its ability to form a coherent waterproofing coating substantially free from granulations or "crystalline" bodies such as have been referred to above. In Ser. No. 608,888 I have particularly called attention to the difficulty of securing stable permanent solutions and coherent coatings.

If, instead of using ordinary naphtha (benzin) coal tar naphtha composed of benzol or mixtures of benzol and toluol is used, a stable and fairly concentrated solution of Pontianak resin may be obtained. In such a compatible solvent, as distinguished from an incompatible solvent like ordinary naphtha, the resin is in a condition where, on exposure, good coherent films or coatings are obtained.

If stable solutions in ordinary naphtha (benzin) are required of a considerable degree of concentration these may be secured by heating the resin to say 550° F. or higher for an hour or two when concentrations as high as 50% even, may be obtained. Such extremely concentrated solutions are very well adapted for priming concrete so as to seal the pores of the aggregate thoroughly, thereby making possible the subsequent painting or finishing with ordinary linseed oil paint and the like.

Except for its odor carbon bisulfid is a useful solvent for such resins, especially those which have been heat treated. Mixtures of benzol and carbon bisulfid are even more effective than either solvent alone, in some cases. Ordinary naphtha, that is, petroleum benzin may be used to advantage in conjunction with carbon bisulfid. The solutions which are obtained in these ways have about the same, or even greater concentration of non-volatile matter as is obtained in the manufacture of many of the grades of ordinary varnishes, paint oils and the like; thus permitting the waterproofing of concrete by the application of only one or two coats and effectively treating the concrete surface inexpensively. A simple formula consists in melting one part of Pontianak resin and thinning with about two parts light coal tar naphtha. Another formula consists of one part Pontianak resin, one fourth part ceresin wax, or Montan wax, and two parts of the naphtha. Still another formula of a somewhat different character consists of one part of Pontianak resin, one eighth part of spindle oil, one eighth part of tung oil and slightly less than two parts of the naphtha. Tung oil has a tendency to diminish the "gloss" or surface finish while fish oil enhances it. For interior work a gloss is often considered undesirable, while exterior work sometimes shows better waterproofing results if finished in gloss. A formula to this end is made from one part of Pontianak resin, one fourth part of kauri resin, one eighth part each of boiled tung oil and fish oil and three fourth parts of naphtha.

With raw Pontianak resin, that is, resin which has not been heat-treated, petroleum naphtha, more particularly in conjunction with coal tar naphtha may be used more or less; especially if, as set forth in Ser. No. 588,549, the petroleum product is more volatile than the aromatic product. In the foregoing formulas, in case the raw resin is used, the coal tar naphtha may be replaced to the extent of 10%-20%, more or less, by petroleum naphtha.

As stated, a colloidal thickener is required for solutions which are to be applied to very porous concrete, for the rubber resin solution as usually prepared has rather slight body in concentrations of 25% or 30% or so. To prevent suction on the work the addition of such colloids as polymerized oils, particularly polymerized tung oil, aluminum tungate or the aluminum soap of fish oil are serviceable. Rubber also may be used as a colloiding material. Certain waxes may be used in moderate amount, although not as satisfactory for this specific purpose as the above mentioned colloids. The waxes as a rule diminish the gloss; a consideration of some importance in the case of finish for stucco, which usually is specified as dull or matt. Saponifiable waxes such as beeswax, which have a slow neutralizing action on the free alkali of concrete are not desirable in a priming coat and are not as effective as the inert waxes like ceresin. Montan wax or Montanic acid may however be used to advantage in some cases.

A product resistant to suction is secured by saponifying a drying oil, such as linseed oil, fish, Chinese wood oil, corn or cotton seed oil with caustic alkali and subsequently precipitating the soap formed in this manner by a soluble salt of aluminum, or any other suitable metallic salt which forms a substantially water-insoluble soap but soluble in oils or volatile hydrocarbon solvents and the like to form colloidal solutions. Inasmuch as lime is the active ingredient, to a very large extent, in concrete, the lime soaps of these oils may be advantageously used. The aluminum soaps however have pronounced colloiding or bodying properties and are to be preferred when a viscous oil is desired.

The oils from which the metallic soap is prepared may be treated so as to be completely saponified by the use of the requisite amount of caustic alkali and subsequent complete precipitation as a metallic soap, or the oil may be partly saponified according to circumstances. If concrete is not painted until it has been exposed to the weather for a number of years, which is sometimes the case, a good deal of the alkali has become carbonated and is not active. Under such circumstances, the presence of a moderate amount of saponifiable oil, especially if accompanied by a large proportion of unsaponifiable material, is not always objectionable.

A partially saponified composition may be made by mixing one quart of wood oil, one quart of water and three and one half fluid ounces of caustic soda of 50% strength. This is boiled for an hour or so or until saponification has absorbed the alkali. After saponification is completed, one half pound of pulverized Pontianak resin may be added to the solution. Six ounces of concentrated alum are dissolved in one half gallon of hot water. This solution is added gradually to the wood oil soap to throw down the oil mixture. Unsaponified oil and the Pontianak resin are carried down with the aluminum tungate and the coagulum is washed two or three times with water and dried. To make a concrete oil containing this colloidal thickener a solution of Pontianak resin may first be made, by dissolving three and one half pounds of melted Pontianak resin in one gallon of benzol. One to two pounds of the aluminum tungate composition are dissolved in a gallon of the Pontianak resin solution. 3% to 5% of wax may be added if it is desired to increase the flatting action. The Pontianak resin may, if desired, be heated to 500° F. to 600° F. for an hour or more before thinning with the benzol, or other solvent; in which case five to eight pounds of the resin per gallon of benzol may be used for special work exposed to extreme service conditions.

The greater the amount of the colloiding aluminum compound used the greater the body of the oil. Three to four pounds of Pontianak resin and three pounds of aluminum tungate to a gallon of benzol give a composition of high body. When a completely saponified colloidal thickener is desired the proportions may be one quart of tung oil, two quarts of water and about six ounces of caustic soda, which mixture is boiled for a half hour or so until the oil is completely saponified. Precipitation with concentrated alum is made as before, using of course sufficient alum to combine with all the saponified product. On drying this material a tough mass is produced which is difficult to melt and a little kauri or Pontianak resin and so forth may be added as a fluxing material. From this form of the tungate a concrete oil may be made by melting one pound of tungate with two and one half pounds of Pontianak resin, thinning with five pounds of benzol and one pound of thin Japan oil.

Fish oil may also be advantageously employed to prepare the aluminum or other colloidal metallo-organic compounds utilized herein. To make the aluminum soap of this oil the procedures set forth under the foregoing formulas may be employed and the aluminum soap resulting substituted in aforesaid formulas. The lime soap of fish oil may be prepared by heating fish oil with hydrated lime and similarly used. As a rule the soaps prepared by precipitation (wet process) are more colloidal and are more satisfactory than those prepared by melting (fusion process) or "boiling". The question of the surface effect or finish has also to be considered in this connection. The "boiling" operation of varnish making tends to give products drying with a gloss. Cold mixing of solutions of the various non-volatile ingredients more often gives products drying with an egg shell or dull finish. For example boiling together a mixture of Pontianak resin, tung oil and aluminum tungate, and thinning the boiled product while hot with a suitable thinning vehicle generally gives a gloss finish; while if the Pontianak resin and tungate be melted at the lowest temperature possible, thinned and cooled, and then tung oil added, a duller finish is afforded.

In Ser. No. 497,934, filed May 24, 1909, now Patent 1,112,059, I have set forth the advantages of applying to concrete a priming coat of an oily character containing fatty acids, especially those of siccative oils and have enumerated the following illustrative formulas:—(A) one part of free fatty acid from linseed oil, one part of linseed oil and one part of tung oil; (B) equal parts of linseed oil and linseed oil fatty acids; (C) equal parts of linseed oil, linseed oil fatty acids and gum thus; (D) linseed oil eight parts, linseed oil fatty acids seven parts, tung oil three parts, resin two parts, lithopone 15 parts and gypsum four parts—other resins such as Manila or kauri copal being substituted for the resin, if desired, or the resinous material omitted entirely, or increased and the oil reduced in amount to make a more rapidly drying composition: (E) linseed oil fatty acids seven parts, kauri copal ten parts, resin three parts, benzin six parts, turpentine three parts and zinc sulfid twenty parts.

I have observed that the fatty acid of tung oil possesses the desirable high speed of neutralization characteristic of linseed oil fatty acids and certain others, that like the linseed oil fatty acids the tung acids are miscible with other oils and thinners such as used in varnish making, that they have excellent siccative qualities in the presence of small amounts of driers and that they have a specific waterproofing quality rendering these tung acids very useful in the priming of concrete subject to extreme service conditions. Tung acids may therefore be used in the above formulas A to E inclusive when conditions indicate a greater adaptability for the purpose in hand, than the fatty acids of linseed oil. In the above last mentioned formulas an unsaponifiable or substantially unsaponifiable resin such as Jelutong rubber resin may be substituted for the essentially saponifiable kauri, Manila copal or resin, or for the linseed and Chinese wood oil. It should be noted however that Chinese wood oil is more resistant to lime saponification than linseed oil. Although tung oil is a glycerid and is saponified with considerable ease by potash or soda or other alkali forming a water-soluble soap, it does not saponify easily when in contact with the free lime of cement, provided neither potash or soda are present in more than minute amounts as is the case with some kinds of Portland cement. Thus tung oil has certain advantages over linseed oil in this respect. Tung oil belongs to a class of oils which are rather easily acted on by light to form what appear to be polymerized bodies and in the polymeric or changed conditions are not as sensitive to free lime.

Many drying and non-drying oils may be polymerized by heating to a high temperature for a short period. Linseed oil polymerizes at temperatures between 250–300° C., although at somewhat lower temperatures it is changed in constitution more or less. Castor oil, which is a non-drying oil polymerizes at about the same temperature and then becomes soluble in mineral oils and petroleum thinners. Wood oil polymerizes easily at somewhat lower temperatures and gelatinizes to form an elastic compound which is scarcely soluble in most solvents. If carefully heated only to a point where polymerization begins the product will dissolve in some solvents. The presence of resinous bodies retards gelatinization and permits of heating the oil to much higher temperatures without solidification resulting. The inner anhydrids of the fatty acids which presumably form on such heating are not so easily saponified as the raw oil and if combined with pontianak or similar alkali resistant body having finish-forming properties a concrete oil may be derived which serves fairly well on concrete low in potash or soda. It should be stated that the glycerin content of gelatinized tung oil is less than that of the normal oil, which is a point in its favor in connection with the preparation of concrete oils, as glycerin is not only a hygroscopic substance but it is a solvent for lime, and lime in the form of glycerid may easily exhibit a higher concentration of hydroxyl ions than lime in only aqueous solution. Tung oil is also polymerized or gelatinized by sulfuric acid and the product obtained by using acid only of moderate concentration may be incorporated in concrete oil compositions. Similarly the tung acids may be polymerized by heat or chemical treatment. Castor oil or its fatty acids may be polymerized with gelatinization by heating with a concentrated solution of zinc chlorid or other condensing agent. The reaction is not probably true polymerization but it affords a means of preparing a colloidal thickening agent for certain solutions. When castor oil is treated with strong sulfuric acid, it does not gelatinize like tung oil, but forms ricinsulfonic acid and other sulfonated products. Some of the other animal and vegetable oils act similarly, as is well known. The sulfonated oils may be used as the acid component in acid primers for concrete, or water-insoluble soaps such as the lime or aluminum or zinc compounds may be used as colloidal thickeners. The sulfonic radical in such oils reduces the tendency of the soaps prepared therefrom to hydrolyze under the prolonged action of water or dampness. Acid neutralizers soluble in organic solvents may be obtained from naphthalene by chlorinating to form a hydrochlorid of naphthalene chlorid. This and similar hydrochlorids have the advantage of substantial freedom from corrosive action and so may replace hydrochloric acid to advantage. Chlorinated naphthalene or naphthol and other chlorinated aromatic compounds may be used as thickeners. Chlorinated linseed, tung, cotton-seed, corn and resin oils and the like also in some forms are useful as thickeners. The chlorinated compounds of these oils formed by the action of sulfur chlorid are very useful bodying or colloiding agents, as are also the vulcanized oils derived by heating the oils with sulfur. Sulfur chlorid with rape, tung, linseed, candle nut, soy bean, perilla, resin, corn, cotton seed, fish, peanut, olive, castor, palm, lard, tallow and other oils forms more or less oil-soluble products depending upon the amount of sulfur chlorid employed. The fatty acids from these oils react with sulfur chlorid in a different manner from the glycerids themselves, and as a rule are more soluble in oils and paint thinners. If these oils are mixed with a solution of Pontianak resin or other resin solution, using preferably a solvent unaffected by sulfur chlorid, and to this mixture a suitable quantity of sulfur chlorid is added a more satisfactory incorporation is secured than when the oil is separately treated with sulfur chlorid. The action of the chlorid on the strongly drying oils is so energetic that difficultly soluble compounds are produced unless great care is taken in their preparation and the semi-drying oils are more easily treated with sulfur chlorid for the purpose of producing readily soluble but highly colloidal thickening agents. To obtain these desirable thickening agents free from chlorin the oils may be vulcanized with sulfur at 120° C., more or less. In this case also too great an amount of sulfur produces insoluble bodies and ordinarily from 5% to 10% of sulfur is sufficient. The bodying properties of tung oil are improved by treatment with only 3% of sulfur. Stearic acid does not absorb sulfur at the vulcanizing temperature or melting point of sulfur, or even at somewhat higher temperatures. Oleic acid, on the contrary absorbs some 10% of sulfur at 130° C. to 150° C. and this thickened acid may be used as a neutralizer of concrete alkali in priming compositions. Some of the nitrated oils, as linseed and castor oils, serve as colloidal thickeners.

Among the solvents suitable for the dissolution of Jelutong resin and the like, benzol and its homologues, toluol and xylol are as indicated most useful. Carbon bisulfid is likewise efficient. Carbon tetrachlorid and other chlorids of carbon, such as the chlorids of ethylene and ethane afford noninflammable solutions. Petroleum benzin, ligroin, kerosene, light kerosene or heavy benzin, anilin, light oils of wood tar, wood and grain alcohol, acetone, oil of acetone and other ketones, ethers and esters may be employed. Spirits of turpentine, wood turpentine, Russian turpentine, pine oil and fir tree oil may also be used. In the case of alcoholic solutions and the like, nitrocellulose or celluloid or other colloidal thickener soluble in alcoholic menstruums may be incorporated to give body. The barium and calcium soaps of ricinoleic acid are somewhat soluble in alcoholic bodies and these and similar materials may likewise be employed for thickening the solutions.

The waxy materials referred to above serve a twofold purpose, in that they give body to the solutions and aid in flatting. The unsaponifiable waxes are best from the standpoint of resistance to alkali. Chinese and Japanese waxes are saponifiable. Chinese wax or Chinese vegetable tallow forms a zinc soap which may be used as a thickener; in fact soaps may be made from both of these waxes which are useful colloiding bodies. Bayberry tallow is saponifiable. Beeswax consists largely of cerotic acid and myricyl palmitate with 12% to 15% of hydrocarbons of the ethylene series. It is slowly saponified by cement-alkali and is best used in the form of an oil-soluble metallic soap. Carnauba and shellac wax are difficultly soluble in the solvents preferably employed in making concrete oil compositions. Montan wax and Montanic acid; spermaceti; paraffin; scale wax (a soft crude form of paraffin); ozocerite, or better its refined form, ceresin; candelilla wax; palm wax and Chinese insect wax may be used.

Other materials which may be incorporated for certain applications are the resin esters, e. g. Manila, Congo, colophony. The esters of phenol, cresol, naphthol and glycerin with these resins and their condensation products may be employed. The condensation products of phenol, cresol or other phenolic body with formaldehyde, using a basic or acid condensing agent may, if not condensed beyond a certain point, be used in solution with Pontianak resin or other similar resinous body and the like.

For general purposes where a thickened composition is desired the following illustrative formula is especially applicable:—heat treated Jelutong resin 25 parts, ceresin 2 parts, oil-soluble compound from cotton-seed oil and sulfur chlorid 8 parts, tung acids 10 parts, Japan drier 1 part, benzol 30 parts and benzin 24 parts. Rubber may be substituted for sulfureted cotton-seed oil in the case of very strongly alkaline cements. Tung acids are exceptionally good solvents of recovered rubber, and in using this relatively cheap rubber material the rubber stock may be separately heated with the tung acids until solution is effected and then mixed with the other ingredients.

In the case of structural steel, which as a reinforcing material is to be embedded in concrete a rather viscous coating is to be preferred. Mixtures of guayule rubber resin and Pontianak resin in naphtha solution carrying a filler of dry finely-ground Portland cement are suitable, as set forth in Ser. No. 552,178. Recovered rubber may be used in lieu of guayule and as for such purposes a light colored oil is not usually required admixtures of other material such as pitches, tars, as candle tar, gilsonite, elaterite, asphalt and the like may be made use of. A certain degree of plasticity is desired in such compositions, coupled with good resistance to alkali. The composition must bond both with the steel and the concrete. The incorporation of Portland cement in the concrete oil aids in assimilating the coating composition with the concrete. For this purpose a formula of the following description may be employed:—Pontianak resin (heat treated) 25 parts, recovered rubber 10 parts, wax 5 parts, candle tar 5 parts, gilsonite 5 parts and coal tar naphtha 50 parts, to which mixture is added sufficient dry Portland cement or other filler to make a heavy bodied coating mixture.

By finish-forming constituents as used herein I intend to indicate those materials capable of forming a thin coherent film, including resinous bodies and siccative oils. Paraffin oil and other non-volatile petroleum and non-drying oils have not true finish-forming properties although sometimes used to adulterate drying oils and the like. When introduced into linseed or Chinese wood oil for example paraffin oil retards drying and after or during the process of drying the paraffin oil exudes more or less from the siccative oil film causing a greasy surface which collects dust and renders the oil coating or finish of low durability. Hence, although paraffin oil is unsaponifiable it is unsuited for incorporation in the compositions of the present invention except in very moderate amounts for fluxing or extending purposes. A small amount of petroleum oil sometimes is present in pontianak, being introduced at the time of coagulation or preparation of the raw gum. As petroleum oil reduces the melting point of Pontianak resin and in any substantial amount renders the resin soft and sticky, its use as an extending material is not recommended.

In mixing the priming or finish vehicle with colors or pigments to form paints, care should be taken that these are fast to cement-alkali. Prussian blue or the greens prepared from it are affected by lime. The following pigments may be used to advantage:—for buff; yellow ocher: for light yellow; zinc yellow (zinc chromate): for red; red ocher or red oxid of iron: for blue; ultramarine blue: for green; ultramarine green or oxid of chromium green: for white; zinc white, zinc sulfid or lithopone: for black; mineral black, black oxid of iron, black oxid of manganese: for gray; graphite or mineral black with lithopone. In the case of an acid primer those pigments of a basic character which "liver" are excluded from ready mixed paints in most cases.

To recapitulate, my invention relates to a concrete priming or finish composition comprising essentially a substantial and influential proportion of unsaponifiable finish-forming material; said composition or solution preferably containing 20% or better 25% to 35% of unsaponifiable resinous material, preferably Jelutong rubber resin; said composition also preferably containing a bodying material or colloid thickener such as an oil-or-thinner-miscible vulcanized oil; said composition being stable, fluent and flowable, preferably light colored and preferably transparent to translucent in thin layers, and capable of drying on exposure in thin films to form a firm, adhesive, coherent waterproofing coating resistant to cement-alkali and substantially free from segregation and granulation.

What I claim is;—

1. A coating composition comprising essentially a substantial and influential proportion of unsaponifiable resinous finish-forming material, a thinner and a colloidal bodying agent comprising a vulcanized oil; said composition being stable, fluent and flowable and capable of drying on exposure in thin films to form a coherent firm adhesive waterproofing coating free from granulation.

2. A coating composition adapted for use as a concrete priming or finish composition comprising essentially a substantial and influential proportion of unsaponifiable resinous finish-forming material, a compatible thinner therefor and a colloidal thickener comprising vulcanized oil miscible with said thinner, and tung acids; said composition being stable, fluent and flowable, light colored, transparent to translucent in films of varnish-coating thickness, and capable of drying on exposure in thin films to form a substantially gloss-free, coherent, firm, adhesive waterproofing coating free from granulation and resistant to cement-alkali.

3. A coating composition comprising an unsaponifiable resinous finish-forming material, a thinner and vulcanized Chinese wood oil substantially in the proportions described.

Signed at Chesham in the county of Cheshire and State of New Hampshire this 24th day of July A. D. 1911.

CARLETON ELLIS.

Witnesses:
HERBERT L. CAPRON,
JUDSON N. WALKER.